United States Patent

Martini

[11] 4,181,139
[45] Jan. 1, 1980

[54] MULTIPLE FUNCTION CO₂ VALVE

[75] Inventor: Leonard J. Martini, San Diego, Calif.

[73] Assignee: The United States of America as represented by the Secretary of the Navy, Washington, D.C.

[21] Appl. No.: 853,722

[22] Filed: Nov. 21, 1977

[51] Int. Cl.² .......................................... G05D 16/10
[52] U.S. Cl. .............................. 137/68 A; 137/505.25; 137/571; 137/613
[58] Field of Search ................. 137/68 A, 505.25, 613

[56] References Cited

U.S. PATENT DOCUMENTS

| 2,854,991 | 10/1958 | Webster | 137/613 X |
| 3,437,109 | 4/1969 | Carlson et al. | 137/505.25 |
| 3,810,484 | 5/1974 | Martini | 137/70 |

FOREIGN PATENT DOCUMENTS 2421726  11/1975  Fed. Rep. of Germany ...... 137/505.25

Primary Examiner—Martin P. Schwadron
Assistant Examiner—Richard Gerard
Attorney, Agent, or Firm—Richard S. Sciascia; Ervin F. Johnston

[57] ABSTRACT

A compact fluid pressure regulation valve includes a valve body, the valve body having a pair of passageways, one passageway being a fluid pressure regulating passageway and the other passageway being a high pressure fluid supplying passageway. The fluid supplying passageway extends substantially perpendicular to the pressure regulating passageway and has a downstream end which opens to an upstream portion of the pressure regulating passageway. The fluid supplying passageway has on and off modes for supplying high pressure fluid to the pressure regulating passageway. A device is provided for activating the fluid supplying passageway from an off mode to an on mode. Further, a device is provided within the pressure regulating passageway for utilizing pressure within this passageway as a back pressure to regulate the pressure of the fluid flowing therethrough. With this arrangement a very compact fluid pressure regulation valve is provided.

5 Claims, 4 Drawing Figures

PRESSURE RELIEF VALVE

# MULTIPLE FUNCTION CO₂ VALVE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The U.S. Navy is constantly striving to improve the design of various torpedoes by reducing their size and weight and yet obtain the same performance capabilities therefrom. In many of the torpedoes a pressurized fuel is required to operate a propulsion engine. With such an arrangement the fuel is pressurized from a high pressure gas source, usually $CO_2$, within the torpedo. At the source the pressure may be as high as 4,000 psi, and a regulator valve is provided to reduce this pressure to about 80 to 140 psi before delivery to the fuel tank area. Prior art regulator valves have been very large in size and have been limited to handling a maximum of 3,000 psi source pressure. There has been a need to provide a regulator valve which would be much smaller in size, and yet have the capability of handling at least 3,000 psi source pressure.

SUMMARY OF THE INVENTION

The present invention provides a very compact fluid regulation valve which is capable of handling up to 4,000 psi source pressure and reducing this pressure down to between 80 and 140 psi for pressurizing a fuel source. This has been accomplished by providing a valve body which has a pair of passageways, one passageway being a fluid pressure regulating passageway and the other passageway being a high pressure fluid supplying passageway. The fluid supplying passageway extends substantially perpendicular to the pressure regulating passageway and has a downstream end which opens into an upstream portion of the pressure regulating passageway. The fluid supplying passageway has on and off modes for supplying high pressure fluid to the pressure regulating passageway. A device is provided for activating the fluid supplying passageway from an off mode to an on mode. Further, a device is provided within the pressure regulating passageway for utilizing the pressure within this passageway as a back pressure to regulate the pressure of the fluid flowing therethrough. The valve body may also have a low pressure fluid outlet passageway which has an upstream portion which is connected to a downstream end portion of the pressure regulating passageway and a downstream portion which exits the valve body. The upstream portion of the outlet passageway may extend substantially at an acute angle to the pressure regulating passageway back toward the fluid supplying passageway in substantially the same plane as the pressure regulating and fluid supplying passageways. A downstream portion of the outlet passageway may extend substantially perpendicular to the aforementioned plane. Still further, the valve body may have a high pressure fluid inlet passageway which connects to the fluid supplying passageway for delivering high pressure fluid thereto. The inlet passageway may extend substantially perpendicular to the fluid supplying passageway and substantially parallel to the outlet passageway. With the aforementioned angular relationships of the various passageways and their particular functions the pressure regulation valve can be made extremely compact and yet perform significant reductions in fluid pressures. It should also be understood that the valve can be utilized generally for any desired fluid pressure reduction, and is not restricted to reduction of gas pressure for pressurizing a fuel source.

OBJECTS OF THE INVENTION

An object of the present invention is to provide a very compact fluid pressure regulation valve.

Another object is to provide a fluid pressure regulation valve which is very compact and can be operated remotely to reduce pressure in the order of 40 to 1.

These and other objects of the invention will become more readily apparent from the ensuing specification when taken together with the drawings.

DESCRIPTION OF THE PREFERRED EMBODIMENT

Figure 1:
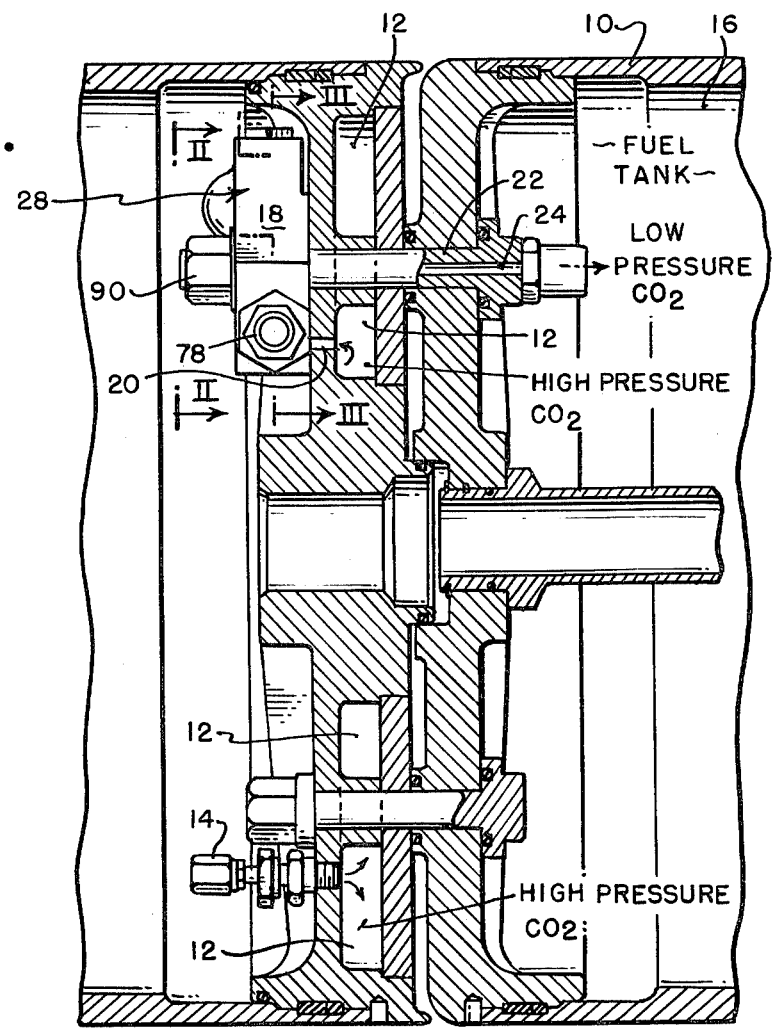
FIG. 1 is a longitudinal cross-sectional view through a portion of a torpedo illustrating the utilization of the present invention.
Figure 2:
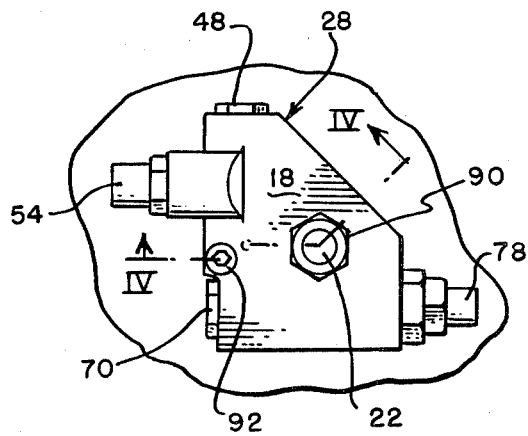
FIG. 2 is a view taken along plane II—II of FIG. 1.

Referring now to the drawings wherein like reference numerals designate like or similar parts throughout the several views, there is illustrated in FIG. 1 a portion of a torpedo 10 which has internal interconnected chambers 12 for containing a highly pressurized gas, such as carbon dioxide. Pressure of this gas may be as high as 4,000 psi, and may be charged to this level through the charging valve 14. After proper pressure reduction, such as 80 to 140 psi, the gas may be fed to a fuel tank 16. The pressurized fuel may then be delivered to a propulsion engine (not shown).

Figure 3:
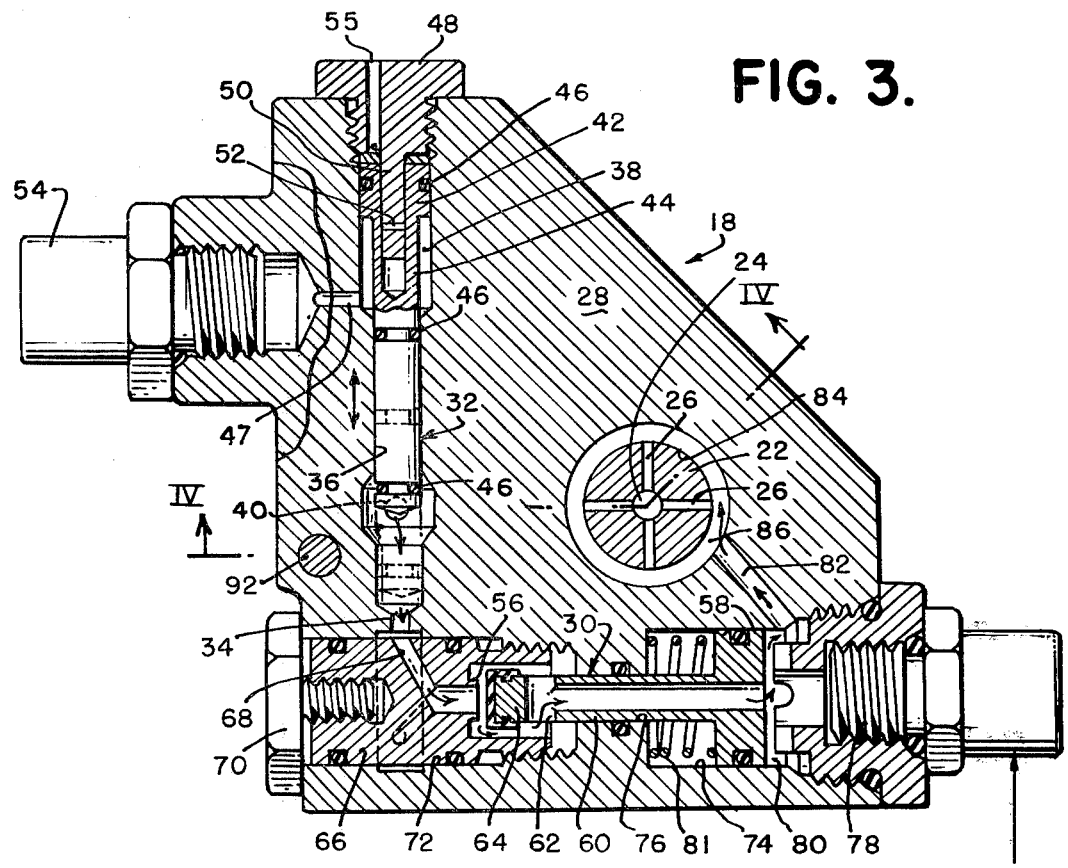
FIG. 3 is a cross-sectional view taken along plane III—III of FIG. 1.
Figure 4:
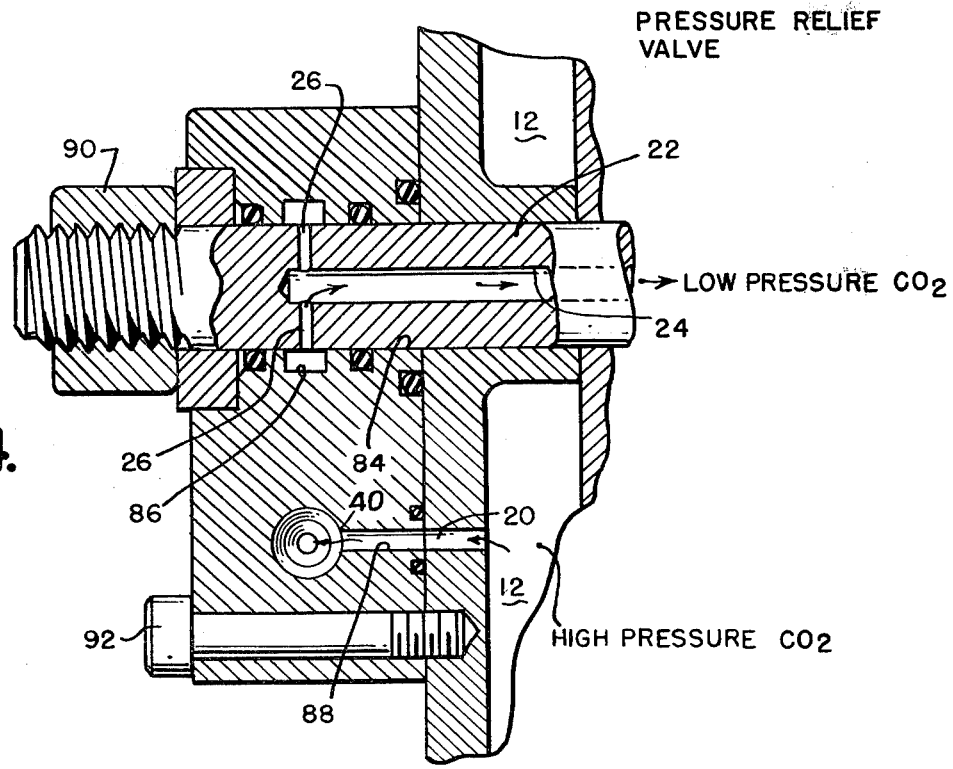
FIG. 4 is a cross-sectional view taken along plane IV—IV of FIG. 3.

The present invention is a very compact fluid pressure regulation valve 18 which is capable of receiving a highly pressurized carbon dioxide from the gas supply source 12 and reducing this pressure sufficiently to pressurize the fuel source 16 prior to delivery of the fuel propulsion engine. The torpedo structure may be provided with a passageway 20 for delivering the high pressurized carbon dioxide to the valve 18, and a bolt 22 with a passageway 24 for delivering the low pressurized gas to the fuel chamber 16. As is illustrated in FIGS. 3 and 4, the bolt 22 has radial passageways 26 for receiving the low pressure gas from the regulation valve 18 and delivering it to the longitudinal passageway 24.

The fluid pressure regulation valve 18 includes a valve body 28 which in turn has a pair of passageways 30 and 32, the passageway 30 being a fluid pressure regulating passageway and the other passageway 32 being a high pressure fluid supplying passageway. The fluid supplying passageway 32 extends substantially perpendicular to the pressure regulating passageway 30, and has a downstream end 34 which opens into an upstream portion of the pressure regulating passageway 30.

The fluid supplying passageway 32 has on and off modes for supplying high pressure fluid to the pressure regulating passageway 30. Means are provided for activating the fluid supplying passageway 32 from the off mode to the on mode. The activating means may include the fluid supplying passageway having a downstream narrow portion 36 and an upstream counterbored portion 38, the downstream narrow portion having a high pressure fluid entrance port 40 which communicates with the torpedo passageway 20 (see FIG. 1). The activating means may further include a piston and rod 42 and 44, the piston being reciprocably and sealably mounted in the upstream counterbored portion 38 of the fluid supplying passageway, and the piston rod being reciprocably mounted in the narrow portion 36 of the fluid supplying passageway. The piston rod 44 is sealed on opposite sides of the fluid entrance port 40 when the piston 42 is in a downstream position (see phantom position in FIG. 3) so as to establish the fluid supplying passageway 32 in the aforementioned off mode. This sealing function may be accomplished by a pair of O-rings 46. It should be noted that since the fluid entrance port 40, which delivers high pressurized fluid, is sealed on both sides that their will be no assertive force on the piston rod 44 due to this pressure. When the piston 42 is moved to an upstream position, as illustrated in full in FIG. 3, the fluid entrance port 40 is opened so as to establish the fluid supplying passageway 32 in the aforementioned on mode for delivering the high pressurized fluid to the pressure regulating passageway 30. The activating means may further include a squib gas passageway 47 which opens into the bottom of the upstream counterboard portion 38 of the fluid supplying passageway below the piston 42 for forcing the piston upstream so as to open the high pressure fluid entrance port 40 to the pressure regulating passageway 30. A plug 48 may be threaded in the upstream end of the fluid supplying passageway 32, the plug having a downwardly extending rod 50 which is slidably received within the piston 42. This rod has a transverse aperture 52 which is capable of receiving a shear wire (not shown) which retains the piston and rod 42 and 44 in the down position (see phantom position in FIG. 3). The shear wire may be sheared by gas pressure through the passageway 47 which may be generated by a squib 54. The plug 48 may be provided with aperture 55 for discharging entrapped gas between the top of the piston 42 and the bottom of the plug 48 when the piston and rod assembly is driven upwardly by the squib gas through the passageway 47. It should now be readily visualized that when the squib 54 is energized the shear wire is broken and the piston and rod assembly 42 and 44 are driven upwardly to open the highly pressurized fluid at port 40 to the pressure regulating passageway 30.

Another feature of the invention for enabling the compactness of the fluid pressure regulation valve 18 are means within the pressure regulating passageway 30 for utilizing the pressure therein as a back pressure to regulate the pressure of the fluid flowing therethrough. This pressure regulation means may include a valve seat 56 in the upstream portion of the pressure regulating passageway for delivering the highly pressurized fluid. A hollow piston and hollow piston rod 58 and 60 respectively are mounted in the pressure regulating passageway 30 downstream from the valve seat 56, the piston rod 60 having apertures 62 at its upstream end for being open to the high pressure fluid which is delivered at the valve seat 56. Piston rod 60 has a valve head 64 which cooperates with the valve seat 56 so as to restrict flow, thereby reducing pressure of the fluid depending upon the amount of back pressure, which will be described more fully hereinafter.

The pressure regulation means may further include a plug 66 which is threaded to the upstream end of the pressure regulating passageway 30. The plug 66 may form the aforementioned valve seat 56 at its downstream end, and may have an interior passageway 68 which communicates the fluid supplying passageway 32 to the valve seat 56. The plug 66 may have a head 70 which is exposed exteriorly of the valve body 28 for threading the plug inwardly or outwardly within the pressure regulating passageway 30 so as to set the spacing between the valve seat 56 and the valve head 64. With such an arrangement, the degree of pressure reduction within the pressure regulating passageway 30 may be adjusted by various positioning of the plug 66.

The pressure regulation means may also include the pressure regulating passageway 30 having upstream and downstream counterbored portions 72 and 74 respectively with a narrow portion 76 therebetween. The plug 66 is threaded into the upstream counterbored portion 72, the piston rod 60 is slidably and sealably mounted through the narrow portion 76, and the piston 58 is slidably and sealably mounted within the downstream counterbored portion 74.

The pressure regulation means may still further include a pressure relief plug 78 which is mounted in the downstream end of the pressure regulating passageway 30 opposite the downstream end of the piston 58 for providing a chamber 80 to establish back pressure on the piston 58 and for relieving this pressure if it exceeds a predetermined amount. The pressure in chamber 80 provides a back force on the piston 58 so as to establish a spacing between valve head 64 and valve seat 56 which will regulate the pressure from a high pressure, such as 4,000 psi, to a low pressure, such as 80 to 140 psi. The relationship between the valve head 64 and the valve seat 56 may be established in a normally open condition by a spring 81 which is disposed in a downstream counterbored portion 74 of the pressure regulating passageway between the upstream end of this counterbored passageway and the bottom of the piston 58. Accordingly, the back pressure on the top of the piston 58 operates against this spring as well as the force of the incoming highly pressurized fluid at the valve seat 56 against the valve head 64. This arrangement enables a very compact pressure regulation portion of the valve 18.

The angular relationships of the various passageways within the pressure regulation valve 18 are important in establishing the compactness of the valve. As already described, the fluid supplying passageway 32 is substantially perpendicular to the pressure regulating passageway 30. Other passageways for delivering the highly pressurized fluid and exiting the low pressure fluid from the valve are also angled at particular directions in order to establish this compactness. The valve body 28 has a low pressure fluid outlet passageway which has an upstream portion 82 (see FIG. 3) and a downstream end portion 84 (see FIG. 4) which exits the valve body. The upstream portion of the outlet passageway 82 extends substantially at an acute angle to the pressure regulating passageway 30 back toward the fluid supplying passageway 32 in substantially the same plane as the pressure regulating and fluid supplying passageways 30 and 32. The downstream portion of the outlet passageway 84 extends substantially perpendicular to this plane. The bolt 22 extends through the downstream portion of the outlet passageway 84, and an annular groove 86 is this latter passageway may be provided for delivering the low pressure fluid to the lateral passageways 26 within this bolt. With this arrangement the low pressure gas is delivered through the interior of the bolt to the fuel chamber 16 (see FIG. 1). Further, the valve body 28 may have a high pressure fluid inlet passageway 88 which communicates with the fluid supplying passageway 32 via the port 40 (see FIG. 4) for delivering high pressure fluid thereto. The inlet passageway 88 communicates with the torpedo passageway 20 which in turn communicates with the high pressurized fluid reservoir 12. The inlet passageway 88 extends substantially perpendicular to the fluid supplying passageway 32 and substantially parallel to the downstream portion of the outlet passageway 84.

The pressure regulation valve 18 may be retained on the torpedo structure by the bolt 22 and a nut 90. Further, another bolt 92 may extend through the body of the valve and into the torpedo structure for retention purposes. Various O-rings are utilized throughout for obvious purposes and have not been described herein.

OPERATION OF THE INVENTION

In the operation of the invention the chambers 12 within the torpedo are charged to a high pressure with fluid, such as carbon dioxide, through the charging valve 14. The piston and rod 42 and 44 are in the down locked position by a shear wire through the aperture 52 in the rod 50 (see phantom position in FIG. 3). In this position the high pressure gas port 40 is closed off from the pressure regulating passageway 30. When the squib 54 is energized highly pressurized gas operates on the bottom of the piston 42 to break the shear wire and force the piston and piston rod 42 and 44 upwardly, as illustrated in full in FIG. 3, to open the high pressure port to the pressure regulating passageway 30. The highly pressurized fluid then flows through the passageway 68 to the valve seat 56 where the pressure is regulated by this spacing between the valve seat 56 and the valve head 64. The lower pressure gas then travels through the hollow piston rod 60 and piston 58 to a chamber 80 where backpressure on piston 58 operates against the spring 80 and the incoming high pressure fluid at valve seat 56 to regulate the pressure by the spacing between the valve seat 56 and the valve head 64. The low pressure gas is then discharged from the valve 18 through the outlet passageway portions 82 and 84. The bolt 22 and the outlet passageway 84 directs the low pressure gas to the fuel chamber 16 for providing a pressurized fuel source to a propulsion engine (not shown). The degree of pressure regulation may be set by adjusting the threaded plug 66 at the plug head 70 so as to establish a desired spacing between the valve seat 56 and the valve head 64. Further, the regulation can be controlled by the strength of the spring 81. With this arrangement the high pressure fluid at 4,000 psi can be regulated down to a low pressure of 80 to 140 psi with a very compact valve.

Obviously, many modifications and variations of the present invention are possible in the light of the above teachings, and, it is therefore understood that within the scope of the disclosed inventive concept, the invention may be practiced otherwise than specifically described.

What is claimed is:

1. A compact fluid pressure regulation valve comprising:
   a valve body;
   the valve body having a pair of passageways, one passageway being a fluid pressure regulating passageway and the other passageway being a high pressure fluid supplying passageway;
   the fluid supplying passageway extending substantially perpendicular to the pressure regulating passageway and having a downstream end which opens into an upstream portion of the pressure regulating passageway;
   the fluid supplying passageway having on and off modes for supplying high pressure fluid to the pressure regulating passageway;
   means for activating the fluid supplying passageway from an off mode to an on mode;
   means within the pressure regulating passageway for utilizing the pressure therein as a back pressure to regulate the pressure of the fluid flowing therethrough;
   the valve body having a low pressure fluid outlet passageway which has an upstream portion which is connected to a downstream end portion of the pressure regulating passageway and a downstream portion which exits the valve body;
   the upstream portion of the outlet passageway extending substantially at an acute angle to the pressure regulating passageway back toward the fluid supplying passageway in substantially the same plane as the pressure regulating and fluid supplying passageways;
   the downstream portion of the outlet passageway extending substantially perpendicular to said plane;
   the valve body having a high pressure fluid inlet passageway which communicates with the fluid supplying passageway for delivering high pressure fluid thereto;
   the inlet passageway extending substantially perpendicular to the fluid supplying passageway and substantially parallel to the downstream portion of the outlet passageway;
   a valve seat in the upstream portion of the pressure regulating passageway for delivering the fluid;
   a hollow piston and hollow piston rod mounted in the pressure regulating passageway downstream from the valve seat, the piston rod being open to fluid delivered at the valve seat and having a valve head at its upstream end for cooperating with the valve seat to restrict the flow depending upon the amount of said back pressure;
   a plug threaded into the upstream end of the pressure regulating passageway;
   said plug forming said valve seat at its downstream end and having an interior passageway which communicates the fluid supplying passageway with the valve seat; and
   the upstream end of the plug being exposed exterior the valve body for threading the plug inwardly or outwardly within the pressure regulating passageway so as to set the spacing between the valve seat and said valve head.

2. A pressure regulation valve as claimed in claim 1 wherein the pressure regulation means in the pressure regulating passageway further includes:
   the pressure regulating passageway having upstream and downstream counterbored portions with a narrow portion therebetween;
   the plug being threaded into the upstream counterbored portion, the piston rod being slidably and sealably mounted through the narrow portion, and the piston being slidably and sealably mounted within the downstream counterbored portion;

spring means biasing the valve head away from said valve seat;

the fluid supplying passageway having a downstream narrow portion and an upstream counterbored portion, the downstream narrow portion having a high pressure fluid entrance port;

a piston and rod, the piston being reciprocably and sealably mounted in the upstream counterbored portion of the fluid supplying passageway, and the piston rod being reciprocably mounted in the narrow portion of the fluid supplying passageway; and said piston rod being sealed on opposite sides of the fluid entrance port when the piston is in a downstream position to establish the fluid supplying passageway in said off mode and opening the fluid entrance port to the fluid supplying passageway when in an upstream position to establish the fluid supplying passageway in said on mode.

3. A pressure regulation valve as claimed in claim 2 including:

a squib gas passageway opening into the bottom of the upstream counterbored portion of the fluid supplying passageway below the piston for forcing the piston upstream and opening the high pressure fluid entrance port to the pressure regulating passageway; and a rod mounted to the valve body and slidably extending into the piston with a shear wire therethrough for retaining the piston in the downstream position until activated by the squib gas.

4. A pressure regulation valve as claimed in claim 3 including:

a support;

a bolt extending through the support and into the downstream portion of the low pressure fluid outlet passageway;

said bolt having a central passageway which exits a downstream end of the bolt; and the central passageway of the bolt being in communication with the upstream portion of low pressure fluid outlet passageway.

5. A pressure regulation valve as claimed in claim 4 including:

the downstream portion of the low pressure fluid outlet passageway having an annular groove which communicates with the upstream portion of the low pressure fluid outlet passageway; and the bolt having radial passageways which communicate the central passageway of the bolt with said annular groove.

* * * * *